Oct. 12, 1926.
J. K. ROSKAMP
OAT HULLING MACHINE
Filed April 27, 1926
1,602,940
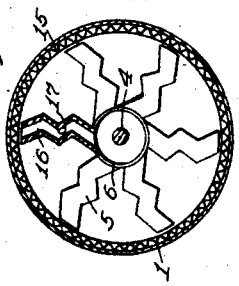
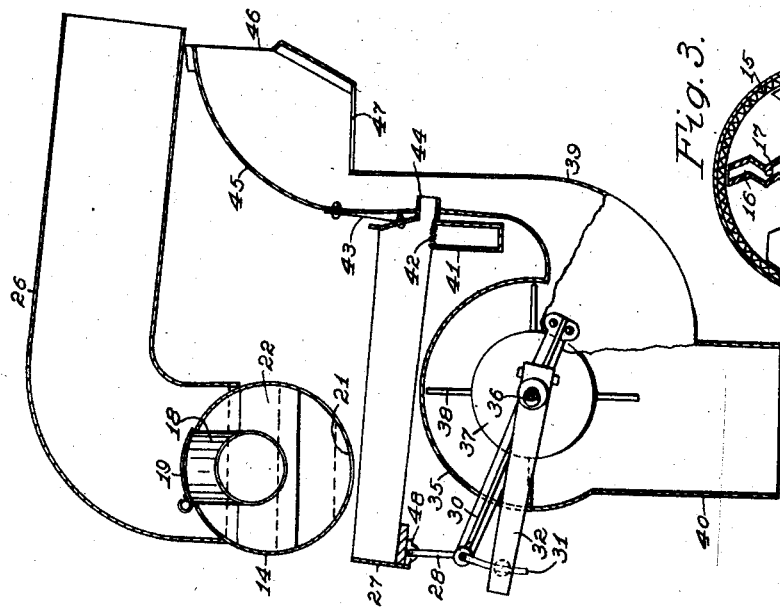
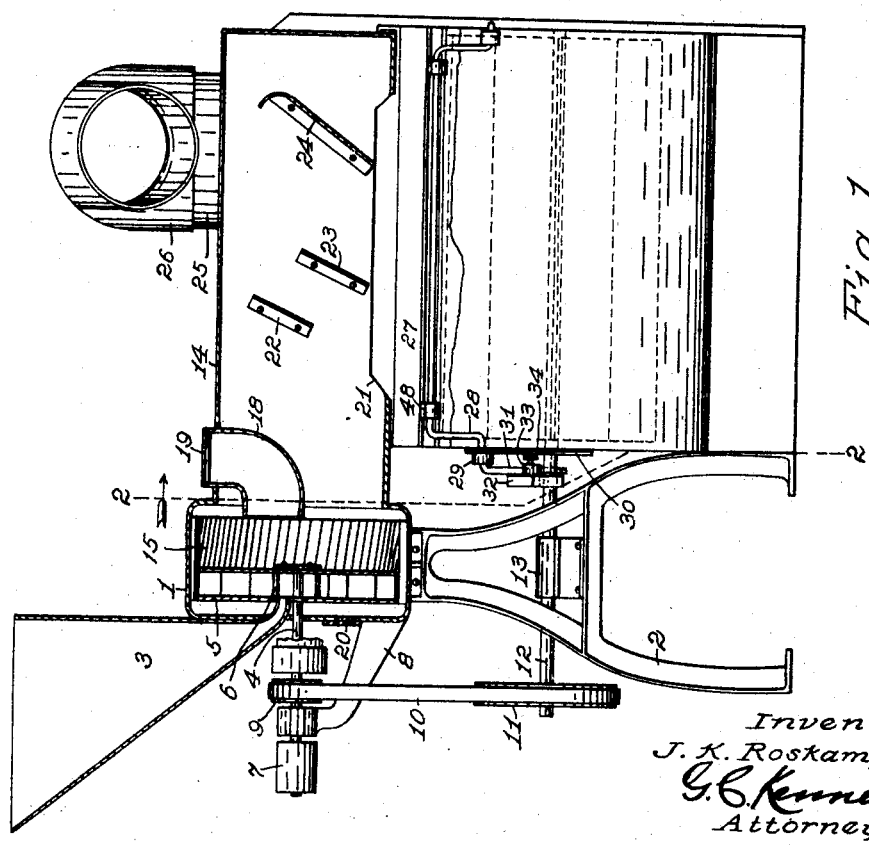
Inventor,
J. K. Roskamp, by
G. C. Kennedy,
Attorney.

Patented Oct. 12, 1926.

1,602,940

UNITED STATES PATENT OFFICE.

JOHN K. ROSKAMP, OF MARSHALLTOWN, IOWA.

OAT-HULLING MACHINE.

Application filed April 27, 1926. Serial No. 104,935.

My invention relates to improvements in oat hulling machines, and the object of my improvement is to provide a machine of this class especially adapted to function for both hulling oats and the like and then separating the removed hulls from the cleaned grain to deliver them into separate places of deposit.

My invention herein is furthermore to improve the constructions of oat hulling devices shown in my prior applications for United States patents, Serial Numbers 57,124 and 73,793.

I have accomplished the above objects by the means which are hereinafter described and claimed, and which are illustrated in the accompanying drawings, it being understood that various modifications may be made in the device shown without departing from the invention.

In said drawings, Fig. 1 is a view, partly in side elevation and partly in medial vertical longitudinal section, of my improved oat hulling machine. Fig. 2 is a vertical cross section thereof taken on the broken line 2—2 of said Fig. 1. Fig. 2 is a vertical cross section of the housing for the hulling device, showing the latter partly in end elevation and partly in cross section.

It is well known that oats have an enswathing hull or wrapper of thin cellulose substance which must be completely removed before the cleaned grain may be ground or otherwise prepared for food, or as feed for animals. My device is designed to quickly remove the hulls from the grain, and also includes means whereby the cleaned grain may be separated from the mingled mass of grain and hulls delivered from the huller, and then deposited in one place while simultaneously the lighter hulls are diverted to another place of deposit.

The numeral 1 denotes a cylindrical housing with open forward end in communicating with a separating chamber 14 also of cylindrical shape but diminished in diameter and positioned horizontally coaxially therewith with closed forward end.

The housing part 1 is fixed upon a stand 2 which also supports a bearing 13 for a rotary shaft 12. Another rotary shaft having an end pulley 7 to be driven by a belt from a source of power, extends centrally into an aperture of the rear end wall of the housing 1 and has on its forward end, fixed thereon, a hulling device 5 inside said housing 1, whose radiating zigzag limbs are hollow and open ended, open outwardly close to a surrounding obliquely crimped ring 15, while their inner ends open into a central chamber 6 open at the rear end to receive unhulled oats from the spout of a hopper 3. A pulley 9 is also secured on the upper shaft 4 and carries a belt 10 whose lower loop fits about a larger pulley 11 on the lower shaft 12.

As shown in Fig. 3, the hulling device 5 has its radiating hollow limbs with forward and back parallel walls while the side walls are zigzag, presenting interiorly opposite angles 17 and reentrant hollows. The shaft 4 is supported in bearings on a bracket 8 secured on the housing 1, while the crimped ring 15 projects forwardly beyond the huller. A curved flue 18 is mounted in the top of the chamber 14, its open upper end in communication with the atmosphere but being supplied with a slide 19 to regulate admission of air. The lower and rear end of this flue opens toward said huller, and the flue is intended to supplement the air supply which enters the housing by way of an open port 20 in the rear wall of the housing.

The bottom of the chamber 14 is opened longitudinally at 21 to deliver into a vibratory sieve device 27 below it. A number of baffle-plates 22, 23 and 24 are fixed slopingly across the interior of the chamber 14 at different levels, to retard mingled grain and hulls carried forwardly against them from the hulling device, so that the grain, being heavier than the hulls, may have their progress overmastered by gravity to drop them downwardly by way of the slot 21 into said sieve 27. The lighter hulls and chaff are by reason of the forward slope of the baffle plates diverted upwardly mostly to pass through an upwardly opening rimmed port 25 into a horizontally rockable windspout 26 to be delivered thence into any suitable receptacle.

All of the cleaned grain falls into the vibratory sieve 27 below which is mounted slopingly toward an end spout 44, the sieve at this end being swingingly suspended on a flexible thin metal plate hanger 43. Immediately in advance of the spout 44 a transverse opening in the sieve bottom is crossed by a wire mesh or netting above and to deliver into a depending trough 41 fixed on the bottom of the sieve to deliver at one end without the machine.

Below the sieve 27 is a fan-chamber 35 through which extends said rotary shaft 12 and carrying on the shaft a cylinder 37 with longitudinal vanes 38. Arms 30 are fixed on the outer ends of the chamber 35 to project therebeyond, and apertured to pass the shaft 12. On the shaft 12 is fixed an eccentric 36 mounted loosely in a fitting aperture of an arm 32. The numeral 28 denotes end cranks on a rock-shaft mounted in bearings 48 on the bottom of the sieve 27, of which one crank is offset medially to rock at its offset part in a bearing 29 on one arm 30, thence depending through a hole in a block 33 at 31 and secured adjustably therein by a set-screw 34, so that the part 31 may have a varied length swing on the arm 32 to thus adjustingly vibrate the sieve 27.

The fan-chamber 35 is supported upon and opens downwardly into an open base chamber 40 which may receive a receptacle for cleaned grain. At one side of the combined chamber and base 35 and 40 a lateral conduit 39 opens and is curved upwardly above the spout 44 of the sieve but receiving the latter through a wall opening. The conduit 39 is curved outwardly at the top part 45, and has an end and a downwardly delivering opening as at 46 and 47.

The hulling device 5 normally is rotated at a speed of 2000 revolutions per minute, while the fan-wheel 38 is rotated at a speed of 300 revolutions per minute. When oats, unhulled, are delivered into the chamber 6 of the huller at the above speed of rotation, they are hurled by centrifugal force through the radiating hollow arms striking the interior angles of the zigzag walls which strip away the hulls, the mingled mass being ejected against the obliquely corrugated ring 15 which finishes the stripping operation, and the grain and hulls are projected into the chamber 14 where they become separated as above described.

The grain which falls upon the vibratory member 27 is carried downwardly toward the spout 44, any broken grain or mealy fragments passing through the sieve 42 into the trough 41 to be separately delivered at an end thereof. The grain, and any small amount of hulls which may have been carried down by the falling grain, passes from the spout 44 into the conduit 39, the grain passing downwardly by gravity into the base chamber 40, while the draft generated by the fan-wheel 38 is sufficient, in entering and passing through the conduit 39—45, to carry and deliver outwardly from the ports 46 and 47 the lighter hulls.

It will be seen that the process is continuous and effective in each of the operations above set forth.

Having described my invention, what I claim as new, and desire to secure by Letters Patent, is:

1. A device of the character described, comprising the combination of a chamber, a rotatable hulling device therein with interiorly rugated hollow outwardly opening arms, a rugated wide annulus surrounding said hulling device, said chamber having a delivery aperture for separated hulls and another aperture for separated grain and hulls mingled therewith, a sieve vibratorily mounted beneath the latter delivery aperture, a vertically disposed conduit having a port to receive from said sieve, and means for propelling a current of air upwardly through said conduit past the said port therein, to drive the hulls out of the upper end of the conduit while allowing the cleaned grain to descend through the lower part of the conduit.

2. A device of the character described, comprising the combination of a chamber having delivery ports for separated grain and hulls, a rotatable hulling device in one end of said chamber delivering into the chamber, said chamber having air inlets of which one inlet is provided with an adjustable closure, a vibratory sieve below said chamber to receive cleaned grain and a residue of separated hulls from one of the delivery ports of said chamber, an open-end conduit having a port to receive said grain and hulls from said sieve, and means for forcing air through the conduit upwardly to carry up and deliver at one end the light hulls and to carry down by gravity the cleaned grain.

3. A device of the character described, comprising the combination with a hulling device, of a ported chamber to receive separated grain and hulls therefrom and divert them outwardly of the chamber separately, and means adapted to receive a residue of unseparated hulls remaining mingled with cleaned grain in said chamber, and secondarily separate them from each other to be separately delivered to different places of deposit.

4. A device of the character described, comprising the combination with a hulling device, of a separating chamber for the cleaned grain and removed hulls issuing therefrom, said chamber having separate means for receiving and independently delivering said grain and hulls, and other separating means adapted to receive only the cleaned grain and any residue of hulls mingled therein from said chamber and separating them and delivering them to different places of deposit.

5. A device of the character described, comprising the combination with a hulling device, of a separating device for the cleaned grain and removed hulls issuing from the hulling device, said chamber having separate means for receiving and independently delivering said grain and hulls, and other separating means adapted to receive only the cleaned grain and fragments thereof mingled with any residue of removed hulls, said means including a device for removing the grain fragments from the whole cleaned grain and residue of hulls mingled therewith, and also including another means for separating therein said cleaned grain and residue of hulls mingled therewith and conducting them in opposite directions to independent places of deposit.

In testimony whereof I affix my signature.

JOHN K. ROSKAMP.